United States Patent [19]

Hayashi et al.

[11] Patent Number: 4,983,713

[45] Date of Patent: Jan. 8, 1991

[54] POLYESTER RESIN EXHIBITING OPTICAL ANISOTROPY IN MOLTEN STATE CONTAINING MINOR AMOUNTS OF 6-OXY-2-NAPHTHOYL UNITS

[75] Inventors: Noriyuki Hayashi; Yukihiko Kageyama; Kenji Hijikata, all of Shizuoka, Japan

[73] Assignee: Polyplastics Co., Ltd., Osaka, Japan

[21] Appl. No.: 374,750

[22] Filed: Jul. 3, 1989

[30] Foreign Application Priority Data

Jul. 5, 1988 [JP] Japan .................... 63-167160

[51] Int. Cl.$^5$ ............. C08G 63/02; C08G 63/18; C08G 63/00; C08G 67/00
[52] U.S. Cl. .................... 528/190; 528/176; 528/193; 528/271; 528/272; 528/274; 524/601; 524/604; 524/605
[58] Field of Search ............ 528/176, 190, 193, 271, 528/272, 274; 524/601, 604, 605

[56] References Cited

U.S. PATENT DOCUMENTS

| | | | |
|---|---|---|---|
| 4,219,461 | 8/1980 | Calundann | 528/190 |
| 4,318,841 | 3/1982 | East et al. | 528/190 |
| 4,370,466 | 1/1983 | Siemionko | 528/193 |
| 4,473,682 | 9/1984 | Calundann et al. | 524/605 |
| 4,522,974 | 6/1985 | Calundann et al. | 524/605 |
| 4,684,712 | 8/1987 | Ueno et al. | 528/190 |

Primary Examiner—Harold D. Anderson
Assistant Examiner—T. Mosley
Attorney, Agent, or Firm—Burns, Doane, Swecker & Mathis

[57] ABSTRACT

A novel polyester resin is provided which exhibits an anisotropic melt phase. The polymer comprises recurring 4-oxybenzoyl units, 6-oxy-2-naphthoyl units, aromatic dicarboxy units, and aromatic diol units as described in appropriate concentrations. The resulting polyester exhibits excellent melt processability in combination with good mechanical properties and a good retention of properties at elevated temperatures.

10 Claims, No Drawings

POLYESTER RESIN EXHIBITING OPTICAL ANISOTROPY IN MOLTEN STATE CONTAINING MINOR AMOUNTS OF 6-OXY-2-NAPHTHOYL UNITS

The present invention relates to a polyester resin exhibiting optical anisotropy in a molten state which is excellent (1) in stability of form and physical properties at elevated temperatures (hereinafter abbreviated as "heat resistance") and (2) in processability, and a composition containing the same.

BACKGROUND OF THE INVENTION

Various polymers exhibiting optical anisotropy in a molten state (liquid-crystal polymers) have been proposed as thermoplastic resins which are excellent in both heat resistance and processability. Representative examples thereof are polymers disclosed in commonly assigned U.S. Ser. Nos. (1) 335,444, filed Apr. 10, 1989, (now U.S. Pat. No. 4,918,154) (2) 335,438 filed Apr. 10, 1989, (now U.S. Pat. No. 4,937,310), and (3) 335,504, filed Apr. 10, 1989 (now U.S. Pat. No. 4,920,197). These liquid-crystal polymers each exhibit liquid-crystal properties by virtue of the rigid segment incorporated into its skeleton, so that they are excellent in strength and heat resistance and are easily processable by virtue of their excellent melt flowability.

However, it is important for achieving the practical use of a liquid-crystal polymer in some industrial fields that it be further improved in the areas of heat resistance and processability as discussed hereafter.

That is, with respect to processability, a thermoplastic resin should have a suitable flow-initiating temperature, flowability in a molten state, and should be sufficiently thermally stable to cause neither excessive generation of gas nor discoloration during its processing.

Among them, the flow-initiating temperature and the flowability can be improved by utilizing a liquid-crystal polymer. However, when the processing of a thermoplastic resin is carried out at a temperature exceeding 300° C., it is difficult to inhibit by the addition of a conventional stabilizer for thermoplastic polymers the generation of gas resulting from polymer decomposition and discoloration during processing. Accordingly, the processing temperature of a thermoplastic resin commonly cannot be too highly elevated.

The preferred molding temperature for a thermoplastic resin, particularly a polyester, is about 370° C. or below. At a temperature exceeding 370° C., the thermal degradation of a thermoplastic resin commonly proceeds rapidly, so that no consistent strength of a thermoplastic resin can be guaranteed following such thermal processing. Further, such a processing temperature is beyond the service temperature range of a conventional molding machine.

With respect to heat resistance, a thermoplastic resin should be excellent in retention of form and mechanical strengths in a high-temperature atmosphere. Particularly, a thermoplastic resin to be used in an electric or electronic field is inevitably subjected to soldering, so that the stability of form and physical properties thereof at 260° C. or above is more important.

From the standpoints described above, a liquid-crystal polymer should also be improved in the areas of both processability and heat resistance. However, these two characteristics tend to be contradictory to each other for conventional thermoplastic resins, so that it is very difficult to lower the melting point or pour point of a liquid-crystal polymer, which is an indication of the processability thereof, while enhancing the reliability of heat distortion resistance and mechanical properties thereof at an elevated temperature.

A liquid-crystal polyester derived from 6-hydroxy-2-naphthoic acid p-hydroxy benzoic acid, aromatic diol and aromatic diacid (as defined therein) in certain concentrations is disclosed in U.S. Pat. No. 4,219,461.

SUMMARY OF THE INVENTION

In view of the above problems, the inventors of the present invention have intensively studied to obtain a thermoplastic resin which satisfies both of the contradictory goals of excellent heat resistance and processability and is also excellent in reliability of mechanical properties even in a severe high-temperature atmosphere. It has been found that a polyester comprising specified constituent units as described hereafter can overcome the above problems.

Namely, the present invention provides a polyester resin exhibiting optical anisotropy in a molten state which comprises constituent units represented by the following formulas (I) to (IV) as essential components wherein the contents of the units (I), (II), (III) and (IV) are 50 to 85 mole percent, 0.5 to 2.8 mole percent, 0.5 to 30 mole percent, and 0.5 to 30 mole percent respectively, based on the total amount of the constituent units. A polyester exhibiting optical anisotropy in a molten state also is provided which further contains, in addition to the above constituent units, at least one constituent unit selected from among those represented by the following formulas (V) to (VII) with the proviso that the contents of the units (V), (VI) and (VII) are at most 5 mole percent, at most 10 mole percent, and at most 30 mole percent respectively, based on the total amount of the constituent units:

(I)

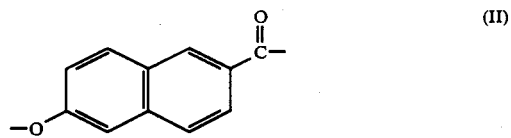

(II)

(III)

wherein Ar is a divalent group having at least one aromatic ring,

(IV)

wherein Ar' is a divalent group having at least two aromatic rings,

(V)

wherein X and Y may be the same or different from each other and are each

or —O—,

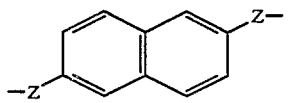 (VI)

wherein Z is

or —O—, and

 (VII)

wherein Ar" is a divalent group having at least one aromatic ring.

According to the present invention, a polymer having good processability and heat resistance which are well-balanced with each other can be obtained by combining specified constituent units as described above at a specified ratio as described above, and particularly by restricting the content of the constituent unit (II) within a low range.

The starting compound for the constituent unit (I) is p-hydroxybenzoic acid or a derivative thereof and examples of the derivative include acid esters, such as acetoxybenzoic acid; esters such as methyl, ethyl, butyl and phenyl esters of hydroxybenzoic acid; and acyl chlorides, such as hydroxybenzoyl chloride.

The constituent unit (I) is used in an amount of 50 to 85 mole percent, preferably 60 to 80 mole percent, based on the total amount of the constituent units.

The starting compound for the constituent unit (II) is 2-hydroxy-6-naphthoic acid or a derivative thereof. Examples of the derivative include acid esters such as 2-acetoxy-6-naphthoic acid; esters such as methyl, ethyl, butyl and phenyl esters of 2-hydroxy-6-naphthoic acid and acyl chlorides, such as 2-hydroxy6-naphthoyl chloride.

The constituent unit (II) is used in an amount of 0.5 to 2.8 mole percent, preferably 1 to 2.8 mole percent based on the total amount of the constituent units. The constituent unit (II) has a great influence on the characteristics of the polymer even in a small concentration.

The starting compound for the constituent unit (III) is terephthalic acid or a derivative thereof and examples of the derivative include esters such as methyl, ethyl and phenyl esters of terephthalic acid and acyl chlorides, such as terephthaloyl chloride.

The constituent unit (III) is used in an amount of 0.5 to 30 mole percent, preferably 10 to 30 mole percent based on the total amount of the constituent units.

The starting compound for the constituent unit (IV) is 4,4'-dihydroxybiphenyl or a derivative thereof represented by acetoxylated 4,4'-dihydroxybiphenyl.

The consistent unit (IV) is used in an amount of 0.5 to 30 mole percent, preferably 10 to 30 mole percent based on the total amount of the constituent units.

The starting compound for the constituent unit (V) is one or more members selected from among isophthalic acid, m-hydroxybenzoic acid, resorcinol and derivatives of them. Examples of the derivative include isophthalates, such as methyl, ethyl or phenyl ester of isophthalic acid and m-hydroxybenzoic acid, isophthaloyl chloride, hydroxybenzoyl chloride, m-acetoxybenzoic acid and diacetoxyresorcinol.

The constituent unit (V) is used in an amount of at most 5 mole percent, preferably 0.1 to 3 mole percent based on the total amount of the constituent units.

The starting compound for the constituent unit (VI) is one or more members selected from among 2,6-naphthalenedicarboxylic acid, 2,6-dihydroxynaphthalene and derivatives thereof. Examples of the derivatives include 2,6-naphthalenedicarboxylates, such as the dimethyl, diethyl or diphenyl ester of 2,6-naphthalenedicarboxylic acid, 2,6-naphthalenedicarbonyl chloride, and 2,6-diacetoxynaphthalene.

The constituent unit (VI) is used in an amount of at most 10 mole percent, preferably 0.1 to 8 mole percent, based on the total amount of the constituent units.

The constituent unit (VII) has only one aromatic ring and is distinct from the constituent unit (IV) in this respect. Particularly, it includes diacetoxyhydroquinone and derivatives thereof.

The constituent unit (VII) is used in an amount of at most 30 mole percent, preferably 0.1 to 25 mole percent, based on the total amount of the constituent units.

The polymer of the present invention can be prepared by the polymerization of the compounds as described above according to the direct polymerization method or the ester-interchange method. The polymerization may be generally carried out by melt polymerization or slurry polymerization.

The polymerization may be carried out in the presence of various catalysts. Representatives examples thereof include dialkyltin oxides, diaryltin oxides, titanium dioxide, alkoxytitanium silicate, titanium alcoholates, salts of alkali and alkaline earth metals with carboxylic acids and Lewis acids, such as $BF_3$.

The amount of the catalyst to be used is generally about 0.001 to 1 percent by weight, preferably about 0.01 to 0.2 percent by weight, based on the total amount of the monomers used.

The polymer thus prepared may be further polymerized in a solid phase by heating either under a reduced pressure or in an inert gas to increase the molecular weight thereof.

According to the present invention, the requirement that a polymer should exhibit optical anisotropy in a molten state is essential for the polymer to be excellent in both heat resistance and processability. The presence of an anisotropic molten phase can be ascertained by a conventional test with polarized light using crossed nicols. More specifically, a molten sample put on a Leitz hot stage is observed in a nitrogen atmosphere by the use of Leitz polarization microscope (40x magnification). The polymer described above is optically anisotropic, so that when it is placed between the crossed nicols, light is transmitted therethrough. When the sample used is optically anisotropic, polarized light can be transmitted therethrough, even when the sample is in a static molten state.

The properties serving as an index of processability according to the present invention are the liquid-crystal nature of the polymer and the melting temperature (temperature for developing the liquid-crystal property). Whether a polymer exhibits the liquid-crystal property or not has a great influence on the melt-flow properties of the polymer. Therefore, it is essential in the present invention that the polyester resin exhibit a liquid-crystal property in a molten state.

Generally, a nematic liquid-crystal polymer exhibits a remarkable viscosity drop at a temperature of its melting point or above, so that the fact that the polyester resin of the present invention exhibits a liquid-crystal property at a temperature of the melting point or above suggests that the resin is excellent in processability. Further, it is preferred in consideration of the heat deterioration of a polymer in melt-processing and the heating capacity of a molding machine that the polyester resin of the present invention have a melting point (temperature for developing the liquid-crystal property) of up to about 370° C., though it is preferred only from the standpoint of heat resistance that the melting point thereof be as high as possible. Further, it is still preferred that the polyester resin exhibit a melt viscosity of at most $1 \times 10^6$ P., preferably at most $10^4$ P. under a shear of 100 sec$^{-1}$ at a temperature higher than the melting point thereof by at least 10° C. A polymer can exhibit such a viscosity in many cases, as long as it has the desired liquid-crystal property.

The properties serving as an index of heat resistance according to the present invention include rigidity at high temperature and retention of mechanical properties after the thermal history of shaping. Further, with respect to practical heat resistance, it is necessary that the polyester resin have a heat resistance high enough to withstand the soldering which is applied when used in electric applications.

With respect to rigidity at high temperature, the polyester resin may exhibit a torsional rigidity of at least $1 \times 10^3$ as determined with a rheometer at 260° C. From the standpoint of reliability as a material, the polyester resin must not exhibit a highly significant drop in the rigidity in the temperature range of 260° to 280° C., i.e., the retention of rigidity must be at least 50 percent under such conditions. Furthermore, the polyester should not cause any highly significant drop in its rigidity due to its heat deterioration. That is, if the retention of the rigidity is lower than 80 percent, the reliability of the resin will be diminished. Accordingly, in preferred embodiments such retention is at least 80 percent.

The polyester resin of the present invention may contain various fibrous, powdery, granular or flaky organic or inorganic fillers.

The fibrous filler includes inorganic fibrous materials, for example, glass fiber, asbestos fiber, silica fiber, silica/alumina fiber, alumina fiber, zirconia fiber, boron nitride fiber, silicon nitride fiber, boron fiber, potassium titanate fiber and fibers of metals such as stainless steel, aluminum, titanium, copper or brass. Among them, glass fiber is the most representative. Further, the fibrous filler includes high-melting organic fibrous materials, and particular examples thereof include polyamides, fluororesins, polyester resins and acrylic resins.

The powdery or granular filler includes carbon black, graphite, silica, quartz powder, glass beads, milled glass fiber, glass balloons, glass powder, silicates such as calcium silicate, aluminum silicate, kaolin, talc, clay, diatomaceous earth and wollastonite; metal oxides such as iron oxides, titanium oxide, zinc oxide, antimony trioxide and alumina; metal carbonates such as calcium carbonate and magnesium carbonate; metal sulfates such as calcium sulfate and barium sulfate; ferrite, silicon carbide, silicon nitride, boron nitride and various metal powders.

The flaky filler includes mica, glass flake and various metal foils.

The organic filler includes heat-resistant, high-strength synthetic fibers such as aromatic polyester fibers, liquid-crystal polymer fibers, aromatic polyamide and polyimide fibers.

These organic or inorganic fillers may be used alone or as a mixture of two or more of them. The simultaneous use of a fibrous filler with a granular or flaky filler is particularly effective in producing an article which is excellent not only in mechanical strengths but also in dimensional accuracy and electrical properties. The amount of the inorganic filler to be added is at most 95 percent by weight, preferably 10 to 80 percent by weight, based on the total weight of the polyester resin.

If necessary, a sizing agent or surface treatment may be used together with a filler as described above.

The polyester resin of the present invention may be mixed with another thermoplastic resin as far as the object of the present invention is not hindered.

Examples of the thermoplastic resin to be mixed with the polyester resin include polyolefins such as polyethylene and polypropylene; aromatic polyesters comprising aromatic dicarboxylic acids and diols or hydroxy carboxylic acids, such as polyethylene terephthalate and polybutylene terephthalate; polyacetals (homo- or co-polymers), polystyrene, polyvinyl chloride, polyamide, polycarbonate, ABS, polyphenylene oxide, polyphenylene sulfide and fluororesins. These thermoplastic resins may be used also as a mixture of two or more of them.

The aromatic polyester comprising the specified constituent units and exhibiting optical anisotropy in a molten state and the composition containing it according to the present invention have excellent performance characteristics and exhibit excellent flowability at a processing temperature of about 370° C. or below, so that they can be molded by injection, extrusion or compression into various three-dimensional moldings, fibers or films. Particularly, they exhibit excellent flowability during injection molding. Further, they are also excellent in heat resistance and accordingly exhibit high reliability in the retention of mechanical strengths at elevated temperatures. Therefore, they can retain their shape and physical properties during soldering, so that they can advantageously be used in various fields requiring heat resistance and particularly are useful as a component in a device which is soldered.

The following examples are presented as specific illustrations of the claimed invention. It should be understood, however, that the invention is not limited to the specific details set forth in the examples.

EXAMPLES

The present invention will now be described by referring to the following Examples. The methods of measurement used therein will first be described.

(1) Confirmation of liquid-crystal property

Whether a resin is a liquid-crystal one or not was determined by he use of a Leitz polarization microscope. That is, a molten resin sample placed on a Leitz hot stage was observed with crossed nicols in a nitrogen atmosphere at 40x magnification. When polarized light was transmitted therethrough to give a unique pattern, the resin sample was defined as a liquid-crystal polymer.

(2) Melting point (flow-initiating temperature)

A temperature at which a needle having predetermined dimensions penetrated a pressed sheet of 1 mm.

thickness under a predetermined load according to the Vicat method to reach a depth of 0.1 mm. was regarded as a flow-initiating temperature (melting point).

(3) Processability

A sample which exhibited a liquid-crystal property at a temperature of about 370° C. or below and exhibited a viscosity of $10^4$ P. or below as determined with a Capillograph manufactured by Toyo Seiki Co., Ltd. under a shear of 100 sec$^{-1}$ at a temperature higher than the melting point of the sample by 10° C. is shown by "○", while a sample not satisfying both of the requirements is shown by "x".

(4) Determination of resistance to soldering heat

A test piece prepared by cutting a pressed sheet of 1 mm. thickness was immersed in a bath of molten solder at 280° C. for 30 seconds to observe the surface thereof. A case wherein an abnormal change, such as blister, rumple, crack or deformation was observed is shown by "x", while a case wherein no abnormal change was observed is shown by "○".

(5) Determination of modulus of rigidity

A sample piece for tensile test prepared by cutting a pressed sheet of 1 mm. thickness was examined for torsional rigidity at 260° C. and 280° C. with a rheometer manufactured by Rheometric Co., Ltd. The resistance of a sample to deformation in soldering can be evaluated by the rigidity thereof in a high-temperature atmosphere. Therefore, the retention of rigidity was calculated by dividing the rigidity at 280° C. by that at 260° C. and was regarded as an index of the reliability of strength in a high-temperature atmosphere. In order to attain the desired reliability the retention of rigidity must be at least 0.5.

(6) Stability in melting

A resin was kept at a temperature higher than the melting point (flow-initiating temperature) of the resin by 10° C. for 30 minutes to observe the surface thereof. A case wherein an abnormal change such as blister, rumple, crack, discoloration or gasification was observed is shown by "x", while a case wherein no abnormal change was observed is shown by "○". Further, the resin which had been kept in a molten state was examined for torsional rigidity at 280° C. according to the method described in the item (4). The retention was calculated by dividing the torsional rigidity thus determined by the value observed before the melting.

EXAMPLE

As shown in Table 1, 62.2 mole percent of p-acetoxybenzoic acid, 2.8 mole percent of 2-acetoxy-6-naphthoic acid, 17.5 mole percent of terephthalic acid, 17.5 mole percent of 4,4'-diacetoxybiphenyl, and 0.05 percent by weight (based on the total charge) of potassium acetate were fed into a reactor fitted with a stirrer, a nitrogen inlet tube and an outlet for distillate and were heated to 260° C. over a period of 2 hours in a nitrogen stream while distilling off the generated acetic acid. The contents were heated at 260° to 300° C. for 2 hours, at 300° to 320° C. for one hour and at 320° to 360° for one hour successively and kept in a vacuum to distill off the acetic acid. Nitrogen gas was introduced into the reactor to cool the contents to a room temperature. The obtained polymer was observed on a polarization hot stage with a polarization microscope to exhibit optical anisotropy at about 350° C. or above. The melting point, resistance to soldering heat, rigidity, stability in melting and retention of rigidity were each determined by the above-mentioned methods. The results are shown in Table 2.

EXAMPLES 2 to 4, 6 and 7

Various monomer mixtures were each polymerized with a final heating temperature set so as not to be lower than the temperature range in which the resulting polymer can flow in a similar manner to the one described in Example 1. The kinds and amounts of the monomers used are shown in Table 1. The resulting polymers were examined in a similar manner to the one described in Example 1. The results are shown in Table 2.

COMPARATIVE EXAMPLES 5, (a) and 5(b)

Various monomer mixtures were each polymerized with a final heating temperature set so as not to be lower than the temperature range in which the resulting polymer can flow in a similar manner to the one described in Example 1. The kinds and amounts of the monomers used are shown in Table 1. The resulting polymers were examined in a similar manner to the one described in Example 1. The results are shown in Table 2.

EXAMPLE 8

A composition comprising 100 parts by weight of the polymer prepared in Example 1 and 20 parts by weight of glass fiber was examined in a similar manner to the one described in Example 1. The results are shown in Table 2.

TABLE 1

| | Constituents of polymer (mole %) | | | | | | | |
|---|---|---|---|---|---|---|---|---|
| | (I) p-acetoxy-benzoic acid | (II) 6-acetoxy-2-naphthoic acid | (III) terephthalic acid | (IV) 4,4'-diacetoxy-biphenyl | | Other constituent | | Composition |
| Ex. 1 | 62.2 | 2.8 | 17.5 | 17.5 | | — | | — |
| Ex. 2 | 64 | 1 | 17.5 | 17.5 | | — | | — |
| Comp. Ex. 1 | 60 | 5 | 17.5 | 17.5 | | — | | — |
| Comp. Ex. 2 | 65 | 0 | 17.5 | 17.5 | | — | | — |
| Ex. 3 | 62.2 | 2.8 | 17.5 | 15 | (VIII) | diacetoxy-hydroquinone | 2.5 | — |
| Ex. 4 | 50 | 2 | 24 | 24 | | — | | — |
| Comp. Ex. 4 | 28 | 2 | 35 | 35 | | — | | — |
| Comp. Ex. 5(a) | 61 | 3 | 8 | 8 | | — | | — |

TABLE 1-continued

| | Constituents of polymer (mole %) | | | | | | |
|---|---|---|---|---|---|---|---|
| | (I) p-acetoxy-benzoic acid | (II) 6-acetoxy-2-naphthoic acid | (III) terephthalic acid | (IV) 4,4'-diacetoxy-biphenyl | Other constituent | | Composition |
| Comp. Ex. 5(b) | 67 | 3 | 5 | 5 | — | | — |
| Ex. 6 | 64 | 1 | 15.5 | 17.5 | (V) isophthalic acid | 2.0 | — |
| Ex. 7 | 64 | 1 | 15.5 | 17.5 | (VI) 2,6-naphthalene-dicarboxylic acid | 2.0 | — |
| Ex. 8 | 62.2 | 2.8 | 17.5 | 17.5 | — | | glass fiber 20 pts. by wt. (per 100 by wt. of polymer) |

TABLE 2

| | Characteristics of polymer or composition | | | | | | | |
|---|---|---|---|---|---|---|---|---|
| | melting point (°C.) | process-ability | torsional rigidity (kg/cm²) 260° C. | 280° C. | reten-tion | resistance soldering heat | stability in melt-ing | retention of rigidity after melting | Remarks |
| Ex. 1 | 352 | O | 20,000 | 15,000 | 0.8 | O | O | 1.0 | |
| Ex. 2 | 361 | O | 25,000 | 21,000 | 0.8 | O | O | 0.9 | |
| Comp. Ex. 1 | 300 | O | 10,500 | 4,000 | 0.4 | X | O | 1.0 | |
| Comp. Ex. 2 | 402 | X | 28,000 | 23,300 | 0.8 | O | X | 0.7 | |
| Ex. 3 | 354 | O | 20,000 | 15,000 | 0.8 | O | O | 1.0 | |
| Ex. 4 | 320 | O | 15,000 | 10,500 | 0.7 | O | O | 1.0 | |
| Comp. Ex. 4 | 280 | O | 900 | failure in mea-surement | — | X | O | 1.0 | |
| Ex. 5 | 361 | O | 22,000 | 19,000 | 0.8 | O | O | 0.9 | |
| Comp. Ex. 5 | 390 | X | — | — | — | — | — | — | no uniform polymer obtained |
| Ex. 6 | 363 | O | 22,000 | 20,000 | 0.9 | O | O | 0.9 | |
| Ex. 7 | 345 | O | 20,000 | 14,000 | 0.7 | O | O | 1.0 | |
| Ex. 8 | 352 | O | 31,000 | 28,000 | 0.9 | O | O | 0.9 | |

Although the invention has been described with a preferred embodiment it is to be understood that variations and modifications may be employed without departing from the concept of the invention as defined in the following claims.

We claim:

1. A polyester resin exhibiting optical anisotropy in a molten state which comprises constituent units represented by the following formulas (I) to (IV) wherein the concentrations of the units (I), (II), (III) and (IV) are 50 to 85 mole percent, 0.5 to 2.8 mole percent, 0.5 to 30 mole percent and 0.5 to 30 mole percent respectively, based on the total amount of the constituent units:

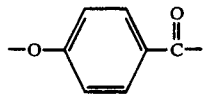
(I)

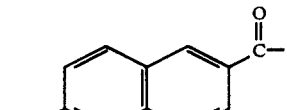
(II)

(III)

wherein Ar is a divalent group having at least one aromatic ring,

—O—Ar'—O— (IV)

wherein Ar' is a divalent group having at least two aromatic rings.

2. A polyester resin exhibiting optical anisotropy in a molten state according to claim 1 further comprising one or more constituent units selected from among those represented by the following formulas (V) to (VII) with the proviso that the concentrations of the units (V), (VI) and (VII) are at most 5 mole percent, at most 10 mole percent, and at most 30 mole percent respectively, based on the total amount of the constituent units:

(V)

wherein X and Y are the same or different from each other and are each

or —O—,

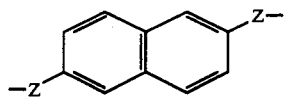
(VI)

wherein Z is

or —O—, and

—O—Ar″—O— (VII)

wherein Ar″ is a divalent group having at least one aromatic ring.

3. A polyester resin exhibiting optical anisotropy in a molten state according to claim 1 wherein the Ar of the formula

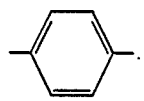

4. A polyester resin exhibiting optical anisotropy in a molten state according to claim 2 wherein the Ar of the formula (III) is 5. A polyester resin composition comprising a polyester resin exhibiting optical anisotropy in a molten state according to claim 1 and at most 95 percent by weight of an inorganic filler based on the weight of the polyester resin.

6. A polyester resin composition comprising a polyester resin exhibiting optical anisotropy in a molten state according to claim 2 and at most 95 percent by weight of an inorganic filler based on the total weight of the polyester resin.

7. A polyester resin composition comprising a polyester resin exhibiting optical anisotropy in a molten state according to claim 3 and at most 95 percent by weight of an inorganic filler based on the total weight of the polyester resin.

8. A polyester resin exhibiting optical anisotropy in a molten state according to claim 1 wherein unit (I) is present in a concentration of 60 to 80 mole percent, unit (II) is present in a concentration of 1 to 2.8 mole percent, unit (III) is present in a concentration of 10 to 30 mole percent, and unit (IV) is present in a concentration of 10 to 30 mole percent.

9. A polyester resin exhibiting optical anisotropy in a molten state according to claim 8 wherein unit (III) is derived from terephthalic acid or a derivative thereof.

10. A polyester resin exhibiting optical anisotropy in a molten state according to claim 8 wherein unit (IV) is derived from 4,4′-dihydroxybiphenyl or a derivative thereof.

* * * * *